US010735468B1

United States Patent
Viljoen

(10) Patent No.: US 10,735,468 B1
(45) Date of Patent: Aug. 4, 2020

(54) SYSTEMS AND METHODS FOR EVALUATING SECURITY SERVICES

(71) Applicant: CA, INC., San Jose, CA (US)

(72) Inventor: Pieter Viljoen, Manhattan Beach, CA (US)

(73) Assignee: CA, Inc., San Jose, CA (US)

( * ) Notice: Subject to any disclaimer, the term of this patent is extended or adjusted under 35 U.S.C. 154(b) by 242 days.

(21) Appl. No.: 15/432,905

(22) Filed: Feb. 14, 2017

(51) Int. Cl.
*H04L 29/06* (2006.01)
*G06F 21/55* (2013.01)
*G06F 21/56* (2013.01)

(52) U.S. Cl.
CPC .......... *H04L 63/20* (2013.01); *H04L 63/1433* (2013.01)

(58) Field of Classification Search
CPC ............................ H04L 63/20; H04L 63/1433
See application file for complete search history.

(56) References Cited

U.S. PATENT DOCUMENTS

| | | | | |
|---|---|---|---|---|
| 8,352,523 | B1 * | 1/2013 | Sim-Tang | G06F 11/1435 707/829 |
| 8,572,007 | B1 | 10/2013 | Manadhata | |
| 9,516,053 | B1 * | 12/2016 | Muddu | G06N 5/022 |
| 9,860,208 | B1 * | 1/2018 | Ettema | G06F 21/602 |
| 9,992,209 | B1 * | 6/2018 | Keralapura | H04L 63/20 |
| 10,063,587 | B2 * | 8/2018 | Satish | H04L 63/1433 |
| 2006/0026688 | A1 * | 2/2006 | Shah | G06F 21/577 726/25 |
| 2010/0138931 | A1 * | 6/2010 | Thorley | G06F 21/552 726/27 |
| 2014/0237595 | A1 * | 8/2014 | Sridhara | H04L 63/1408 726/23 |
| 2014/0282871 | A1 * | 9/2014 | Rowland | H04L 63/20 726/3 |
| 2015/0067859 | A1 * | 3/2015 | Katz | H04L 63/1408 726/23 |
| 2015/0101049 | A1 | 4/2015 | Lukacs | |

(Continued)

OTHER PUBLICATIONS

Viljoen; Systems and Methods for Detecting Malicious Computing Events; U.S. Appl. No. 15/431,795, filed Feb. 14, 2017.

(Continued)

*Primary Examiner* — Yonas A Bayou
(74) *Attorney, Agent, or Firm* — FisherBroyles, LLP

(57) ABSTRACT

The disclosed computer-implemented method for evaluating security services may include (i) receiving, at a backend security server from an enterprise, multiple suspicious computing events detected within the enterprise, (ii) recording, within the backend security server, historical security information for each computing event that includes (a) a classification of the computing event as malicious or non-malicious based on a security analysis performed by the backend security server and (b) a point in time at which the classification was determined, (iii) evaluating an ability of the backend security server to detect security threats by (a) detecting an additional computing event within the enterprise and (b) determining, based on the historical security information, a point in time at which the backend security server became capable of classifying the additional computing event, and (iv) adjusting a security policy within the enterprise based on the evaluated ability of the backend security server.

20 Claims, 6 Drawing Sheets

(56) References Cited

U.S. PATENT DOCUMENTS

2015/0128204 A1* 5/2015 Lietz .................. H04L 63/0428
726/1
2016/0308902 A1* 10/2016 Beamon ................ G06F 21/604
2016/0330217 A1* 11/2016 Gates .................. H04L 63/1416
2017/0213037 A1* 7/2017 Toledano .............. G06F 21/552

OTHER PUBLICATIONS

Sonar; Symantec; https://support.symantec.com/en_US/article. HOWTO80968.html; Oct. 28, 2016.
Sankruthi; Systems and Methods for Evaluating Security Software Configurations; U.S. Appl. No. 15/362,169, filed Nov. 29, 2016.

* cited by examiner

Table of Historical Security Information
402

| Computing Event Signature | Day of Detection | Classification | Day of Classification |
| --- | --- | --- | --- |
| 0xFILE01 | 01-10-2017 | Malicious | 01-12-2017 |
| 0xFILE02 | 01-10-2017 | Malicious | 01-13-2017 |
| 0xFILE03 | 01-11-2017 | Non-malicious | 01-11-2017 |
| 0xFILE04 | 01-12-2017 | Malicious | 01-15-2017 |
| 0xFILE05 | 01-13-2017 | Non-malicious | 01-14-2017 |

*FIG. 4*

SYSTEMS AND METHODS FOR EVALUATING SECURITY SERVICES

CROSS REFERENCE TO RELATED APPLICATION

This application incorporates by reference the entirety of U.S. application Ser. No. 15/431,795 by Pieter Viljoen, and titled Systems and Methods for Detecting Malicious Computing Events, filed on 14 Feb. 2017.

BACKGROUND

Individuals and organizations frequently use various software security systems to protect their computing devices against abnormal and/or unwanted activity. Such security systems may attempt to detect malicious files, behaviors, and other computing events on an endpoint device and then block, remove, or otherwise prevent these threats from harming the endpoint device.

Customers that purchase or implement software security systems may often wish to evaluate the performance of these systems. For example, a customer may wish to assess a length of time required by a security service to determine the reputation of files after the files are first detected within an endpoint device or enterprise. Traditional systems for performing such evaluations may periodically capture virtual images of security systems and/or security databases implemented on endpoint devices within an enterprise. For example, a conventional evaluation technology may record a virtual image of the malware definitions stored on an endpoint device every day, or as the definitions are updated. The evaluation technology may then retrospectively determine a day on which a security service that provided the malware definitions was first able to detect a particular security threat.

Unfortunately, this process of capturing, storing, and analyzing virtual images of endpoint devices may require prohibitively large amounts of computing resources. Furthermore, conventional evaluation technologies may be unable to comprehensively analyze security information known to a security service on particular days in the event that the security service stores malware signatures and/or other analysis tools remotely. The instant disclosure, therefore, identifies and addresses a need for systems and methods for evaluating security services.

SUMMARY

As will be described in greater detail below, the instant disclosure describes various systems and methods for evaluating security services. In one example, a method for evaluating security services may include (i) receiving, at a backend security server from an enterprise, multiple suspicious computing events detected within the enterprise, (ii) recording, within the backend security server, historical security information for each computing event that includes (a) a classification of the computing event as malicious or non-malicious based on a security analysis performed by the backend security server and (b) a point in time at which the classification was determined, (iii) evaluating an ability of the backend security server to detect security threats by (a) detecting an additional computing event within the enterprise and (b) determining, based on the historical security information, a point in time at which the backend security server became capable of classifying the additional computing event, and (iv) protecting the enterprise from security threats by adjusting a security policy within the enterprise based on the evaluated ability of the backend security server.

In some examples, determining the point in time at which the backend security server became capable of classifying the additional computing event may include (i) classifying the additional computing event as malicious or non-malicious based on at least one malware signature stored within the backend security server and (ii) identifying, based on the historical security information within the backend security server, a point in time at which the malware signature was first used to classify a computing event within the multiple computing events.

In some embodiments, the method may further include recording, within the backend security server, a point in time at which each computing event was detected within the enterprise and/or a point in time at which the backend security server received each computing event from the enterprise. In such embodiments, evaluating the ability of the backend security server to detect security threats may be further based on a length of time between the point in time at which at least one computing event was detected within the enterprise and the point in time at which the backend security server classified the computing event.

In some examples, evaluating the ability of the backend security server to detect security threats may be based on a retrospective analysis of the historical security information recorded in the backend security server, rather than based on virtual images of security information stored within the enterprise at various points in time.

In some embodiments, the classification of each computing event may be determined by (i) determining a disposition score for the computing event that indicates a likelihood that the computing events is malicious and (ii) comparing the disposition score of the computing event with a threshold disposition score that represents a minimum disposition score indicative of malicious computing events. In such embodiments, adjusting the security policy within the enterprise may include determining an optimal threshold disposition score that results in an earlier point in time at which the backend security server became capable of classifying the additional computing event.

In these embodiments, the method may further include (i) determining, for each computing event after the disposition score for the computing event has been determined, an updated disposition score based on new security information that was not available when the disposition score was determined and (ii) determining, for each computing event, an updated classification by comparing the updated disposition score of the computing event with the threshold disposition score. In these embodiments, evaluating the ability of the backend security server to detect security threats may further include (i) determining a false positive rate produced by the threshold disposition score by calculating a percentage of computing events that have a classification of malicious and an updated classification of non-malicious and (ii) determining a false negative rate produced by the threshold disposition score by calculating a percentage of computing events that have a classification of non-malicious and an updated classification of malicious.

Furthermore, in these embodiments, determining the optimal threshold disposition score may include receiving, from the enterprise, a desired ratio of false positives to false negatives that corresponds to a desired strictness of security services implemented within the enterprise. In general, a high ratio of false positives to false negatives may correspond to a strict security service. After receiving the desired ratio of false positives to false negatives, the method may include determining, based on a retrospective analysis of the disposition scores and the updated disposition scores of the computing events, an optimal threshold disposition score that produces the desired ratio of false positives to false negatives.

In one embodiment, a system for evaluating security services may include several modules stored in memory, including (i) a reception module that receives, at the backend security server from an enterprise, multiple suspicious computing events detected within the enterprise, (ii) a recording module that records, within the backend security server, historical security information for each computing event that includes (a) a classification of the computing event as malicious or non-malicious based on a security analysis performed by the backend security server and (b) a point in time at which the classification was determined, (iii) an evaluation module that evaluates an ability of the backend security server to detect security threats by (a) detecting an additional computing event within the enterprise and (b) determining, based on the historical security information, a point in time at which the backend security server became capable of classifying the additional computing event, and (iv) a security module that protects the enterprise from security threats by adjusting a security policy within the enterprise based on the evaluated ability of the backend security server. In addition, the system may include at least one physical processor configured to execute the reception module, the recording module, the evaluation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the backend security server from an enterprise, multiple suspicious computing events detected within the enterprise, (ii) record, within the backend security server, historical security information for each computing event that includes (a) a classification of the computing event as malicious or non-malicious based on a security analysis performed by the backend security server and (b) a point in time at which the classification was determined, (iii) evaluate an ability of the backend security server to detect security threats by (a) detecting an additional computing event within the enterprise and (b) determining, based on the historical security information, a point in time at which the backend security server became capable of classifying the additional computing event, and (iv) protect the enterprise from security threats by adjusting a security policy within the enterprise based on the evaluated ability of the backend security server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a table of example historical information indicating security properties of computing events.

Figure 1:
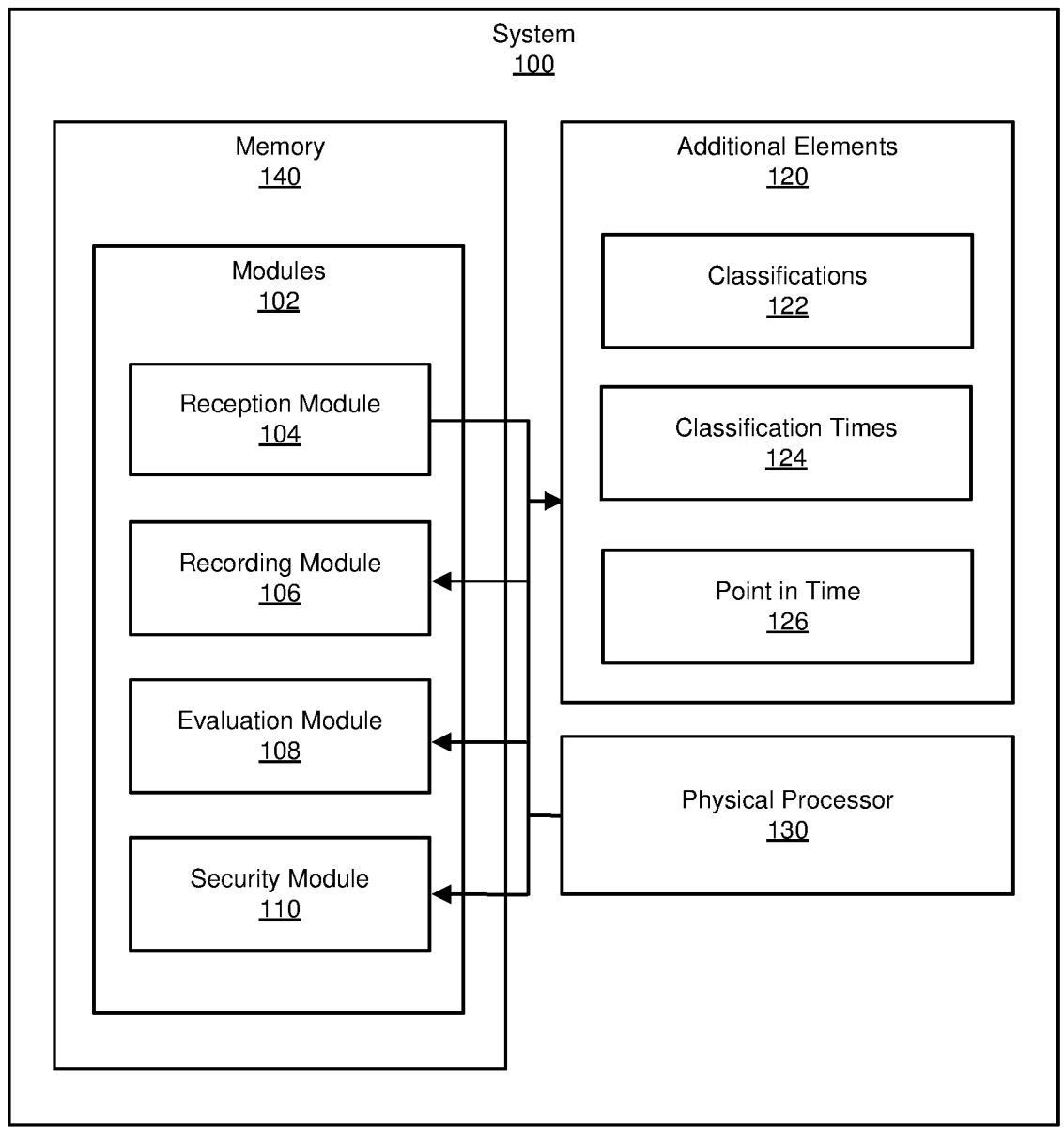
FIG. 1 is a block diagram of an example system for evaluating security services.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTIONS OF EXAMPLE EMBODIMENTS

The present disclosure is generally directed to systems and methods for evaluating security services. As will be explained in greater detail below, by recording attributes of suspicious files, computing behaviors, and other computing events detected on endpoint devices by a security service, the disclosed systems and methods may retrospectively analyze the performance of the security service. For example, the systems and methods described herein may determine points in time at which the security service became capable of definitively determining the reputation of a particular computing event, thereby providing customers with an evaluation of the effectiveness of the security service. In addition, the disclosed systems and methods may perform such an evaluation without capturing and storing virtual images of security services implemented on endpoint devices.

In addition, the systems and methods described herein may improve the functioning of a computing device within an enterprise by adjusting security policies (such as thresholds used to identify malicious computing events) based on a retrospective analysis of the performance of a security service. These systems and methods may also improve the fields of malware detection and security service analysis by efficiently and accurately determining lengths of time required by a security service to analyze and classify suspicious computing events.

Figure 2:
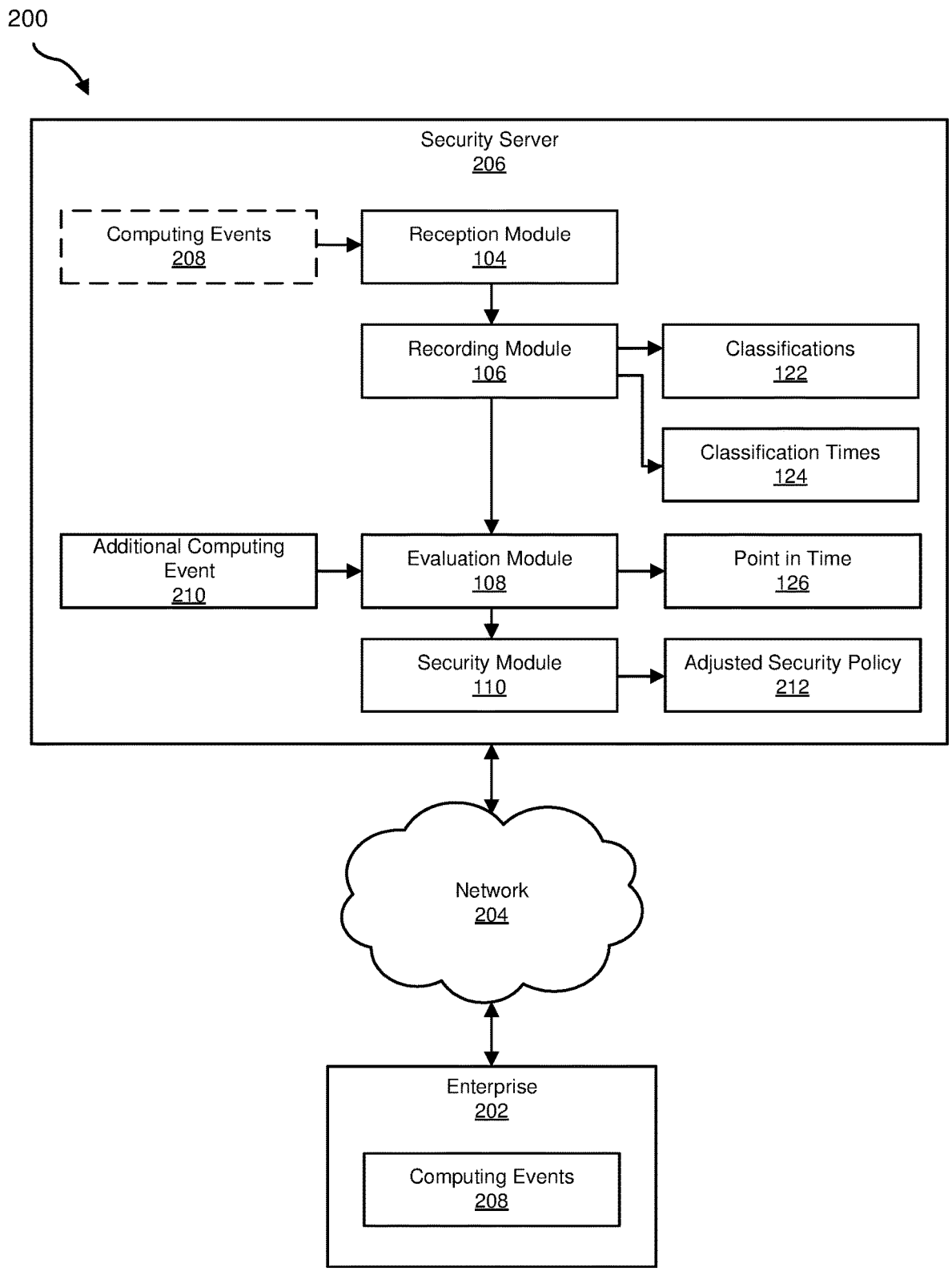
FIG. 2 is a block diagram of an additional example system for evaluating security services.

The following will provide, with reference to FIGS. 1 and 2, detailed descriptions of example systems for evaluating security services. Detailed descriptions of corresponding computer-implemented methods will also be provided in connection with FIG. 3. Detailed descriptions of historical information indicating security properties of computing events will be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for evaluating security services. As illustrated in this figure, example system 100 may include one or more modules 102 for performing one or more tasks. As will be explained in greater detail below, example system 100 may include a reception module 104 that receives, at a backend security server from an enterprise, multiple suspicious computing events detected within the enterprise. In addition, example system 100 may include a recording module 106 that records, within the backend security server, historical security information for each computing event that includes (i) a classification of the computing event as malicious or non-malicious based on a security analysis performed by the backend security server and (ii) a point in time at which the classification was determined.

Example system 100 may also include an evaluation module 108 that evaluates an ability of the backend security server to detect security threats by (i) detecting an additional computing event within the enterprise and (ii) determining, based on the historical security information, a point in time at which the backend security server became capable of classifying the additional computing event. Finally, example system 100 may include a security module 110 that protects the enterprise from security threats by adjusting a security policy within the enterprise based on the evaluated ability of the backend security server.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate evaluating security services. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In one example, additional elements 120 may include classifications 122. Classifications 122 generally represent any qualitative assessment of the security properties of a computing event. As shown in FIG. 1, additional elements 120 may also include classification times 124. Classifications times 124 generally represent points in time (e.g., dates, timestamps, etc.) at which classifications 122 were determined. Finally, additional elements 120 may include a point in time 126, which generally refers to any point in time at which a backend security server became capable of classifying a particular computing event.

Example system 100 in FIG. 1 may be implemented in a variety of ways. For example, all or a portion of example system 100 may represent portions of example system 200 in FIG. 2. As shown in FIG. 2, system 200 may include endpoint devices within an enterprise 202 in communication with a security server 206 via a network 204. In one example, all or a portion of the functionality of modules 102 may be performed by security server 206 and/or any other suitable computing system. As will be described in greater detail below, one or more of modules 102 from FIG. 1 may, when executed by at least one processor of security server 206, enable security server 206 to evaluate security services. For example, and as will be described in greater detail below, reception module 104 may cause security server 206 in receive, from enterprise 202, computing events 208 detected within enterprise 202. In addition, recording module 106 may cause security server 206 to record classifications 122 and classification times 124 associated with computing events 208. Evaluation module 108 may then cause security server 206 to evaluate an ability of security server 206 to detect security threats by detecting an additional computing event 210 within enterprise 202 and determining point in time 126 at which security server 206 became capable of classifying additional computing event 210. Finally, security module 110 may cause security server 206 to protect enterprise 202 from security threats by generating an adjusted security policy 212 based on the evaluated ability of security server 206.

Enterprise 202 generally represents any type or form of individual, group of individuals, business, or organization that subscribes to or implements a security service. In some examples, enterprise 202 may include one or more endpoint devices. In one embodiment, the endpoint devices within enterprise 202 may operate client-side security software (e.g., software agents managed by a security service). Examples of such endpoint devices include any type or form of computing device capable of reading computer-executable instructions, such as laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Security server 206 generally represents any type or form of computing device that is capable of evaluating security services based on computing events received and classified by the security services. In one example, security server 206 may represent a backend security server that provides security services for one or more enterprises (such as enterprise 202). Additional examples of security server 206 include, without limitation, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between enterprise 202 and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
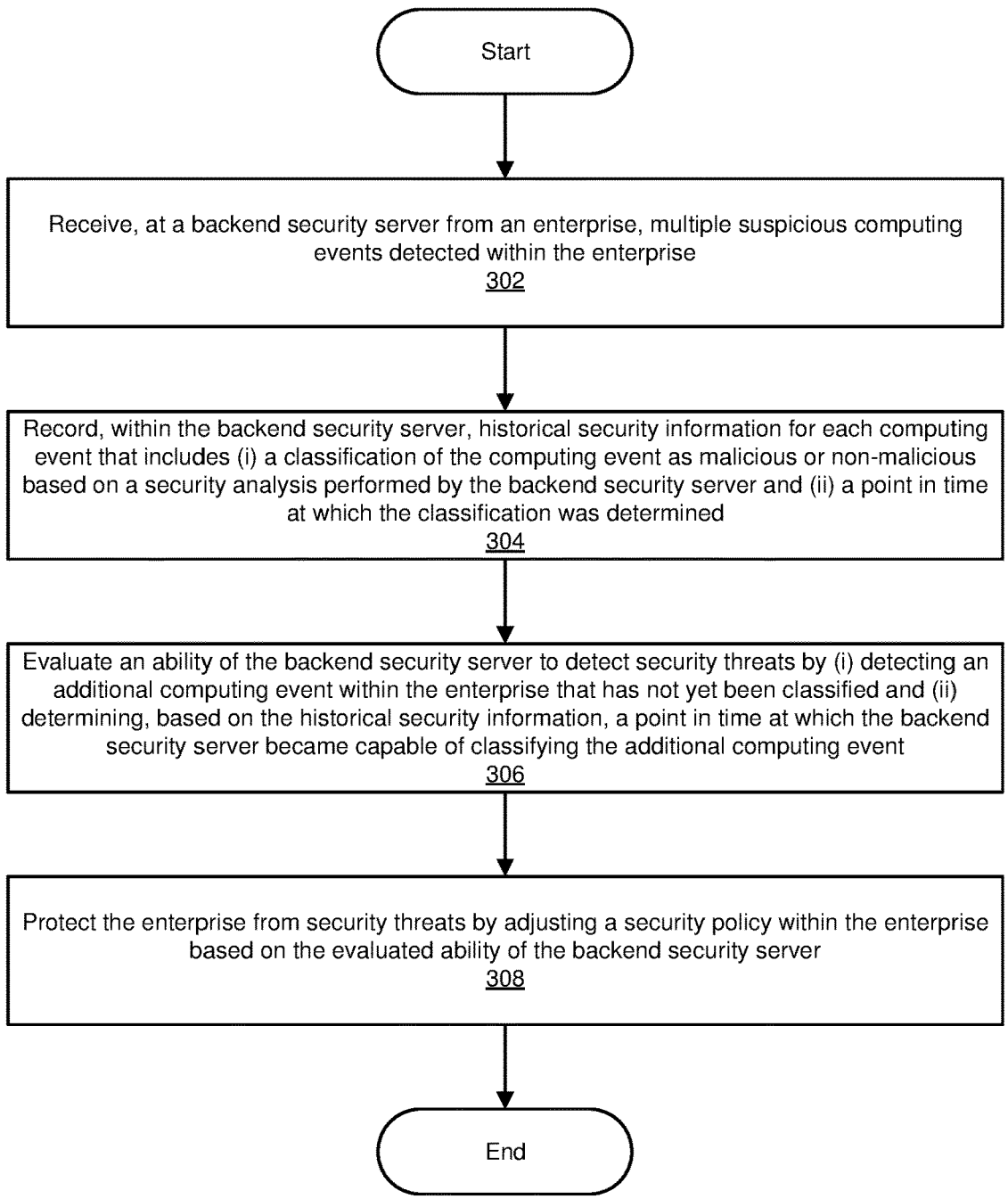
FIG. 3 is a flow diagram of an example method for evaluating security services.

FIG. 3 is a flow diagram of an example computer-implemented method 300 for evaluating security services. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at a backend security server from an enterprise, multiple suspicious computing events detected within the enterprise. For example, reception module 104 may, as part of security server 206 in FIG. 2, receive computing events 208 from enterprise 202.

The term "computing event," as used herein, generally refers to any type or form of incident, behavior, or action detected on or in connection with a computing device. In some examples, a computing event may represent any alteration in the configuration (e.g., software, settings, data, files, programs, etc.) of a computing device that may potentially compromise the security state of the computing device. For example, a computing event may represent an attempt by a user of an endpoint device to download, install, or execute a file or program on the endpoint device. In other examples, a computing event may represent an attempt by a user to distribute (e.g., via an electronic message or removable storage device) sensitive information from an endpoint device. Alternatively, a computing event may represent an attempt by an external entity to access sensitive information within an endpoint device (e.g., via intrusions, phishing attacks, and/or other security breaches).

The disclosed systems may detect computing events on endpoint devices in a variety of ways. In some examples, security module 110 may deploy software security agents on all or a portion of the endpoint devices within an enterprise. These agents may monitor the endpoint devices for any type or form of computing event that is potentially indicative of a security threat. For example, deployed agents may identify files that users of endpoint devices attempt to install or run. In addition, security agents may monitor content of emails and other electronic messages distributed to and from the endpoint devices. Additionally or alternatively, deployed agents may identify network resources (e.g., servers, websites, cloud-based applications, etc.) accessed by users via their endpoint devices.

Security agents deployed within an enterprise may identify a variety of information about detected computing events. In some examples, the agents may identify behaviors of a file involved in a computing event. For example, a security agent may record interactions between a detected file and other programs on an endpoint device. Similarly, a security agent may identify computing resources (e.g., registries, databases, or network resources) accessed or altered by a file. In addition, a security agent may identify and/or generate a hash of a file. In further examples, security agents may identify relevant contextual or configuration details about the endpoint device on which a computing event was detected, such as settings of an endpoint device and/or a user of the endpoint device. In addition, security agents may record a point in time (e.g., a date and/or time or day) at which a computing event occurred.

Furthermore, in some examples, a security agent may determine one or more security properties of a computing event. For example, a security agent may compare attributes of a computing event with malware definitions or signatures (e.g., hashes of files, objects, or behaviors known to be malicious). In one embodiment, a security agent may analyze a computing event using malware definitions or other security information provided by the security service that manages the security agent. The security agent may access the security information either locally (e.g., the information may be stored directly on the endpoint device on which the security agent is running) or remotely (e.g., the information may be stored in a cloud-based database or backend security server).

After a security agent identifies information about a computing event, the agent may send the information to reception module 104. Security agents within an enterprise may distribute such information to reception module 104 in real time (e.g., immediately after detection) or periodically (e.g., in batches). As will be explained in greater detail below, the disclosed systems may use this information to evaluate the ability of a security service to detect security threats.

Returning to FIG. 3, at step 304 one or more of the systems described herein may record, within the backend security server, historical security information for each computing event that includes (i) a classification of the computing event as malicious or non-malicious and (ii) a point in time at which the classification was determined. For example, recording module 106 may, as part of security server 206 in FIG. 2, record historical security information for computing events 208 that includes classifications 122 and classification times 124.

The term "historical security information," as used herein, generally refers to any collection of data, reports, or statistics describing the results of security evaluations performed on one or more computing events. In some examples, historical security information may include classifications of one or more computing events, as well as points in time at which the computing events were first detected and then classified. The term "classification," as used herein, generally refers to any qualitative assessment of the security properties of a computing event. In one embodiment, the systems described herein may classify computing events using a binary scale (i.e., evaluation module 108 may classify computing events as either "malicious" or "non-malicious").

In some examples, a classification of a computing event may represent a qualitative categorization of the computing event's disposition score. The term "disposition score," as used herein, generally refers to any quantitative assessment of the likelihood that a computing event is malicious (e.g., harmful to the security state or performance of an endpoint device). As a specific example, a disposition score for a computing event involving a suspicious file may indicate a probability that the file is an instance of malware (e.g., a virus, a worm, spyware, adware, etc.). In another example, a disposition score for a computing event involving an attempt to transfer data from an endpoint device may quantify a likelihood that the transferred data contains sensitive information and/or that the recipient of the data is unauthorized to access the sensitive information.

Evaluation module 108 may determine a disposition score for a computing event based on any type of security analysis or test performed on the computing event. In some embodiments, evaluation module 108 may determine a disposition score for a computing event based on security properties of the computing event identified by a security agent that detected the computing event. For example, evaluation module 108 may directly receive a disposition score from a security agent that was calculated by the security agent based on security information currently available to the security agent. Additionally or alternatively, evaluation module 108 may determine a disposition score for a computing event by performing a security analysis on the computing event at a backend security server based on currently-available security information stored within the security server.

The term "security information," as used herein, generally refers to any type or form of data that represents or indicates properties of computing events that are known to be malicious or non-malicious. Examples of security information include, without limitation, hashes of malicious files, representations of malicious computing behaviors, whitelists of trusted files, blacklists of malicious files, and/or any additional data, test, or analysis that a security service may use to determine the reputation or trustworthiness of a computing event. In addition, the term "currently-available security information," as used herein, generally refers to any security information that is known to or accessible by a security service at a point in time at which the security service first determines a disposition score for a computing event. As will be explained in greater detail below, the term "new security information" generally refers to any security information that became known to or accessible by a security service after the initial disposition score for a computing event has been determined.

In some examples, evaluation module 108 may represent disposition scores as numbers within a predetermined range or scale. For example, evaluation module 108 may assign computing events disposition scores between 0 and 5, with a score of 0 indicating a computing event that is confirmed to be non-malicious and a score of 5 indicating a computing event that is confirmed to be highly malicious. In the event that a security analysis performed on a computing event is inconclusive (e.g., currently available security information indicates slightly malicious or non-malicious properties of the computing event or no security information is currently known about the computing event), evaluation module 108 may assign the computing event a score in the middle of the disposition score range.

After determining a disposition score for a computing event, evaluation module 108 may classify the computing event based on the disposition score. In some examples, evaluation module 108 may determine a classification of a computing event by comparing the computing event's disposition score with a threshold disposition score. The term "threshold disposition score," as used herein, generally refers to any disposition score that represents a minimum or cutoff disposition score indicative of malicious computing events. In some examples, a threshold disposition score may represent a standard or default threshold disposition score (e.g., the disclosed systems may automatically define a threshold disposition score to be implemented within an enterprise). In other examples, a threshold disposition may be specified by or tailored to an enterprise.

In some examples, evaluation module 108 may be unable to score and/or classify a computing event immediately after information about the computing event is sent to reception module 104. For example, a security service may not recognize the computing event and/or may not have access to security information capable of conclusively determining whether the computing event is malicious or non-malicious. Such a situation may occur if a computing event represents the first instance (or one of the first few instances) of a file or object detected by the security service.

Furthermore, in some embodiments, evaluation module 108 may determine that the disposition score and/or classification of a computing event has changed from its initial disposition score and classification. For example, evaluation module 108 may initially classify a computing event as unknown and then later (e.g., a day later, a week later, etc.) determine that new security information is available that indicates the computing event is either malicious non-malicious. In another example, evaluation module 108 may reverse the initial classification of a computing event based on new security information that became available after the initial classification was determined.

The systems described herein may record historical security information for a computing event in a variety of ways. In some examples, recording module 106 may record disposition scores and/or classifications of one or more computing events detected within an enterprise. In addition, recording module 106 may record relevant contextual information about the classification of a computing event, such as a point in time at which the classification occurred, a point in time at which the classification was changed or updated, a particular security analysis (e.g., malware definition) used to determine the classification, and/or a point in time at which the security analysis was generated or identified. Furthermore, recording module 106 may record a point in time at which an enterprise detected a computing event and/or a point in time at which the enterprise sent information about the computing event to reception module 104. As will be explained in greater detail below, the disclosed systems may analyze this historical information to track the progress of classifying particular computing events, as well as to evaluate the overall ability of a security service to detect security threats.

As an example of information that may be recorded by recording module 106, FIG. 4 illustrates a table of historical security information 402. In this example, table 402 may describe attributes and relevant points in time of 5 computing events. In particular, table 402 may store hashes of objects (e.g., files) involved in each computing event, a day on which each computing event was identified within an enterprise, a classification of each computing event, and a day on which each classification was determined or finalized. As shown in FIG. 4, the time required to classify these computing event may range from 0 days to 3 days.

Returning to FIG. 3, at step 306 one or more of the systems described herein may evaluate an ability of the backend security server to detect security threats by (i) detecting an additional computing event within the enterprise and (ii) determining, based on the historical security information, a point in time at which the backend security server became capable of classifying the additional computing event.

The systems described herein may detect an additional computing event in a variety of ways. In some examples, evaluation module 108 may receive, from a security agent operating on an endpoint device within an enterprise, a new computing event that has not yet been classified. In other examples, evaluation module 108 may identify a computing event that was previously received and analyzed by the disclosed systems. Additionally or alternatively, evaluation module 108 may identify a test or sample computing event (e.g., a computing event designed specifically to be used in evaluating a security service).

After identifying an additional computing event, evaluation module 108 may perform a retrospective analysis of previously-recorded historical security information to determine a point in time at which a security service (e.g., the security service implementing the disclosed systems) became capable of accurately classifying the additional computing event. In one example, evaluation module 108 may first determine a classification of the additional computing event based on security information currently accessible to evaluation module 108. Evaluation module 108 may then analyze recorded historical security information for an indication of when the particular piece of security information used to classify the additional computing event was first identified or generated by the security service.

Referring to the example of FIG. 4, evaluation module 108 may determine that an additional computing event has a signature that matches the "0xFILE01" signature in table 402. Based on the historical information within table 402, evaluation module 108 may determine that the security service that identified the signature became capable of classifying the additional computing event on Jan. 12, 2017. In addition, evaluation module 108 may determine that the security service required 2 days to classify a computing event with that signature after receiving the computing event. In another example, evaluation module 108 may determine that an additional computing event corresponds to the signature "0xFILE03" in table 402. In this example, evaluation module 108 may determine that the security service was capable of classifying computing events with that signature on the same day that a computing event with that signature was first received by the security service.

Notably, evaluation module 108 may determine a point in time at which a security service became capable of accurately classifying a computing event based solely on an analysis of recorded historical security information. For example, in contrast to traditional security systems, evaluation module 108 may not rely on analyzing virtual images of endpoint devices and/or security databases to perform retrospective static analyses. These traditional systems may involve extensive computing resources to capture, store, and analyze virtual images of malware definitions and other security information implemented within endpoint devices. In addition, in the event that a traditional security system provides cloud-based detection services, virtual images of endpoint devices may not identify all of the security information available to the security system at a particular point time. By logging attributes of computing events and their associated classification times, the disclosed systems may more accurately and efficiently evaluate the performance of a security system.

As explained above, in some embodiments the disclosed systems may determine that a disposition score and/or classification of a computing event changes over time. For example, evaluation module 108 may determine an initial disposition score and a corresponding initial classification of a computing event when the computing event is first received by reception module 104. At a later point in time, evaluation module 108 may determine an updated disposition score and corresponding updated classification for the computing event based on recently-identified security information.

Application Ser. No. 15/431,795, incorporated herein by reference, discloses example systems and methods for determining initial and updated classifications of computing events. In addition, application Ser. No. 15/431,795 describes calculating rates of false positives and false negatives within initial classifications of computing events. As described in application Ser. No. 15/431,795, a false positive may represent a computing event whose initial classification is malicious and whose updated classification is non-malicious. In addition, a false negative may represent a computing event whose initial classification is non-malicious and whose updated classification is malicious. In some examples, evaluation module 108 may further evaluate the ability of a backend security server to detect security threats based on an analysis of the false positive rates and false negative rates produced by one or more threshold disposition scores implemented by the backend security server. For example, evaluation module 108 may determine a percentage of false positives and/or false negatives within a group of computing events. Additionally or alternatively, evaluation module 108 may calculate a ratio of false positives to false negatives. As will be explained in greater detail below, the disclosed systems may determine false positive rates and false negative rates within an enterprise in order to tailor security policies within the enterprise to the enterprise's specific security needs.

Returning to FIG. 3, at step 308 one or more of the systems described herein may protect the enterprise from security threats by adjusting a security policy within the enterprise based on the evaluated ability of the backend security server. For example, security module 110 may, as part of security server 206 in FIG. 2, protect enterprise 202 from security threats by generating adjusted security policy 214 based on the evaluated ability of security server 206.

The disclosed systems may adjust a security policy within an enterprise in a variety of ways. In some examples, security module 110 may adjust or optimize a threshold disposition score implemented within an enterprise. In particular, security module 110 may determine a threshold disposition score that results in an earlier point in time at which a security service became capable of classifying one or more additional computing events (compared to the point in time produced by the current threshold disposition score). As an example, an enterprise may implement a threshold disposition score of 4 within a scale of 0-5, with a score of 5 indicating a highly malicious computing event and a score of 0 indicating a legitimate computing event. In this example, security module 110 may determine that adjusting the threshold disposition score to 3 results in an earlier classification of a particular computing event. For example, if the initial disposition score of the computing event is 3 and the threshold disposition score is 4, evaluation module 108 may not classify the computing event as malicious (and therefore not mitigate security threats associated with the computing event) until new security information indicates that an updated disposition score of the computing event is at least 4. However, if the threshold disposition score is 3, evaluation module 108 may immediately classify the computing event as malicious.

In some embodiments, security module 110 may adjust a threshold disposition score within an enterprise based on rates of false positives and/or false negatives identified within the enterprise. For example, an enterprise may indicate, to security module 110, a desired rate or ratio of false positives and/or false negatives that corresponds to a desired level of strictness or severity for security services implemented within the enterprise. In general, a high rate of false positives (ora high ratio of false positives to false negatives) indicates a strict security service. For example, a security service that detects a greater number of false positives than false negatives will be more likely to detect true positives. However, large numbers of false positives may inconvenience users and/or hinder productivity within an enterprise. Accordingly, an enterprise that handles highly classified or sensitive information may request a higher ratio of false positives to false negatives than an enterprise that handles less confidential information.

After receiving an indication of the desired strictness of security services for an enterprise, security module 110 may retroactively determine false positive and/or false negative rates produced by various threshold disposition scores. Application Ser. No. 15/431,795 describes example systems for identifying optimal threshold disposition scores that produce desired rates of false positives and/or false negatives. In some embodiments, security module 110 may perform such an analysis to identify a threshold disposition score that results in a rate of false positives and/or false negatives requested by an enterprise.

In some example, security module 110 may further optimize a threshold disposition score based on an analysis of false positive and/or false negative rates produced by one or more threshold disposition scores over time. For example, security module 110 may examine, based on recorded historical security information, lengths of time required to accurately and/or conclusively classify computing events using various threshold disposition scores. As an example, security module 110 may determine that a low threshold disposition score (corresponding to a strict security service) results in a longer "age of detection" (i.e., length of time between a security service receiving a computing event and the security service classifying the computing event) for non-malicious computing events than a higher threshold disposition score. As such, in the event that an enterprise requests a strict security service, security module 110 may determine an optimal threshold disposition score that reduces false negatives while still providing prompt classification times.

After evaluating the ability of a security service to detect security threats, security module 110 may inform a customer of the security service about the results of the evaluation. For example, security module 110 may indicate to a customer an average age of detection provided by a security service. Additionally or alternatively, security module 110 may provide a comparison of the evaluated ability of the security service with abilities of competing security services. For example, security module 110 may indicate to a customer that a security service would have been able to detect a certain security threat at an earlier point in time than another security service.

Additionally, in some examples security module 110 may provide an enterprise with a recommended update or adjustment to a security policy. For example, security module 110 may inform an enterprise about predicted or projected rates of false positives and false negatives, as well as corresponding detection times, for various threshold disposition scores. Additionally or alternatively, security module 110 may recommend an optimized threshold disposition score that has been tailored based on requests from an enterprise. In general, security module 110 may improve security policies implemented within an enterprise in any suitable way to more effectively and/or efficiently detect security threats, such as by whitelisting computing events determined to be legitimate and/or recommending stricter security policies to detect future instances of malicious computing events.

As explained above in connection with FIGS. 3 and 4, a security service may evaluate its ability to accurately and efficiently detect security threats. For example, the security service may perform a retrospective analysis of detected computing events and their classifications as malicious or non-malicious. In particular, the security service may record historical security information that indicates when a computing event was first detected within an enterprise, when the computing event was received by the security service, and when the computing event was conclusively classified as malicious or non-malicious. The security service may then analyze this historical security information to measure the ability of the security service to promptly identify new security threats within the enterprise. By logging attributes of detected computing events and their associated classification times, the security service may perform such a retrospective analysis more efficiently than traditional security systems. In addition, the security service may adjust security policies within the enterprise (such as a threshold used to classify malicious computing events) based on recorded security information and the enterprise's desired security services.

Figure 5:
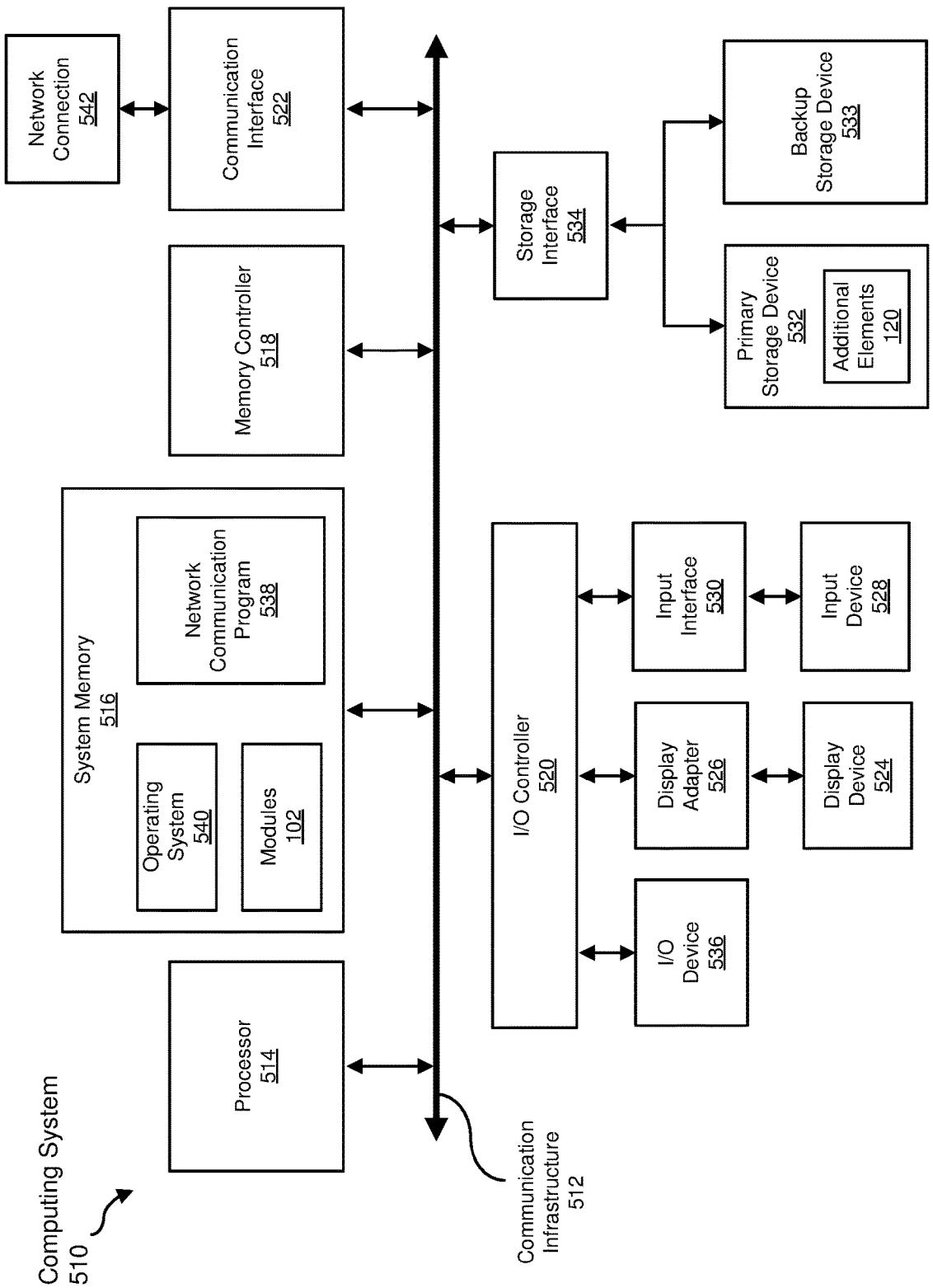
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536.

In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, [additional elements 120] from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
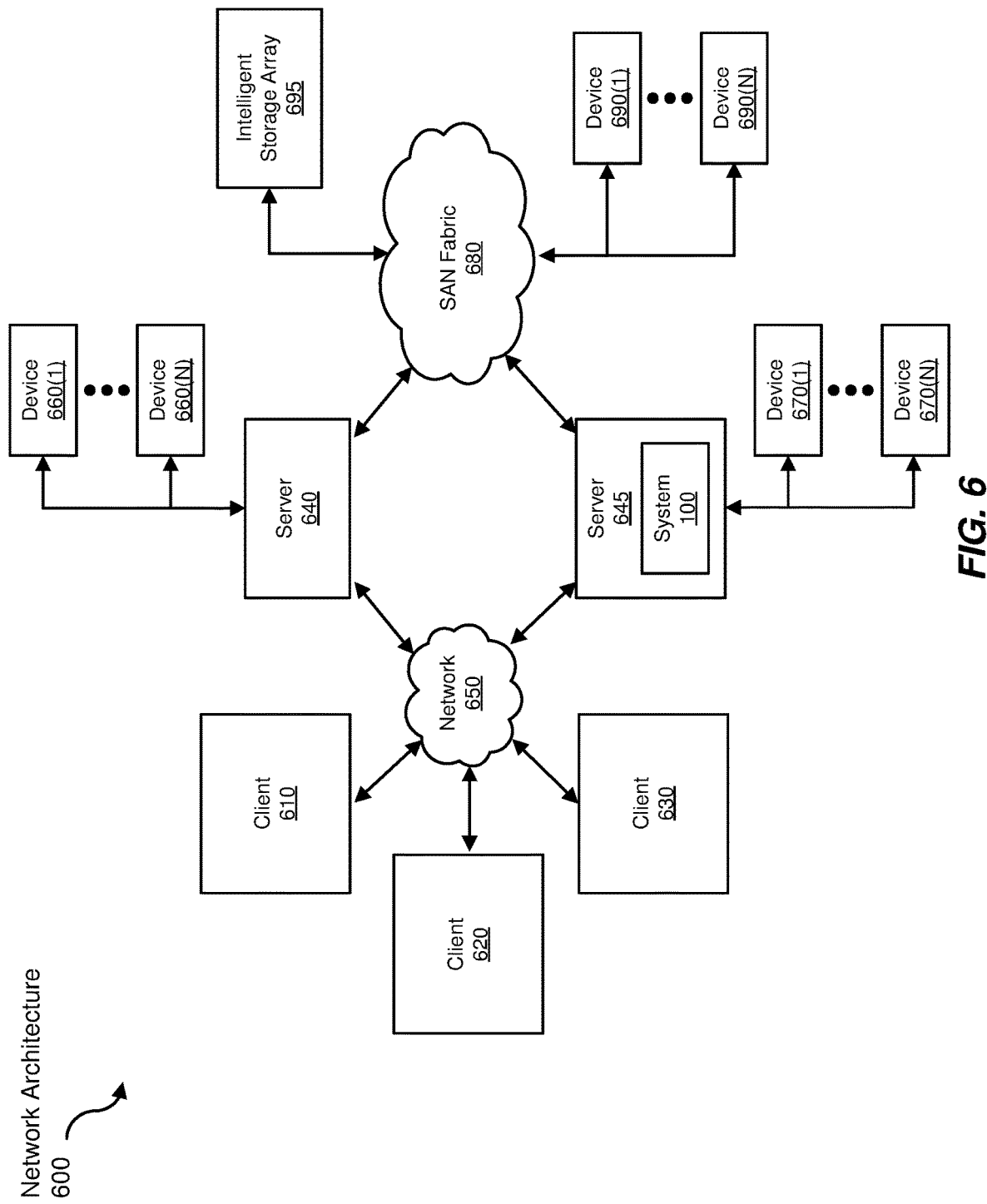
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for evaluating security services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing events detected within an enterprise to be transformed, transform the computing events into an indication of the ability of a security service to promptly detect security threats, output a result of the transformation to the enterprise, use the result of the transformation to adjust security policies within the enterprise, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating security services, at least a portion of the method being performed by a backend security server comprising at least one processor, the method comprising:

receiving, at the backend security server from an enterprise, a plurality of suspicious computing events detected within the enterprise;

recording, within the backend security server, historical security information for each computing event that comprises:

a classification of the computing event as malicious or non-malicious based on a security analysis performed by the backend security server using a set of malware definitions;

at least one malware definition within the set of malware definitions used to classify the computing event;

a specific time at which the classification was determined;

evaluating an ability of the backend security server to detect security threats by:

detecting an additional computing event within the enterprise;

classifying the additional computing event as malicious or non-malicious using at least one particular malware definition within the set of malware definitions;

determining a specific time in the past at which the backend security server became capable of classifying the additional computing event using the particular malware definition by identifying, within the historical security information, a first recorded instance of using the particular malware definition; and protecting the enterprise from security threats by adjusting at least one component of the particular malware definition based on the evaluated ability of the backend security server.

2. The method of claim 1, further comprising recording, within the backend security server:

a specific time at which each computing event was detected within the enterprise; and a specific time at which the backend security server received each computing event from the enterprise.

3. The method of claim 2, wherein evaluating the ability of the backend security server to detect security threats is further based on a length of time between the specific time at which at least one computing event was detected within the enterprise and the specific time at which the backend security server classified the computing event.

4. The method of claim 1, wherein evaluating the ability of the backend security server to detect security threats is based on a retrospective analysis of the historical security information recorded in the backend security server, rather than based on virtual images of security information stored within the enterprise at various times.

5. The method of claim 1, wherein the classification of each computing event is determined by:

determining a disposition score for the computing event that indicates a likelihood that the computing event is malicious; and comparing the disposition score of the computing event with a threshold disposition score that represents a minimum disposition score indicative of malicious computing events.

6. The method of claim 5, wherein adjusting the component of the particular malware definition comprises determining an optimal threshold disposition score that results in an earlier time at which the backend security server became capable of classifying the additional computing event.

7. The method of claim 6, further comprising:
- determining, for each computing event after the disposition score for the computing event has been determined, an updated disposition score based on new security information that was not available when the disposition score was determined; and
- determining, for each computing event, an updated classification by comparing the updated disposition score of the computing event with the threshold disposition score.

8. The method of claim 7, wherein evaluating the ability of the backend security server to detect security threats further comprises:
- determining a false positive rate produced by the threshold disposition score by calculating a percentage of computing events that have a classification of malicious and an updated classification of non-malicious; and
- determining a false negative rate produced by the threshold disposition score by calculating a percentage of computing events that have a classification of non-malicious and an updated classification of malicious.

9. The method of claim 8, wherein determining the optimal threshold disposition score further comprises:
- receiving, from the enterprise, a desired ratio of false positives to false negatives that corresponds to a desired strictness of security services implemented within the enterprise, a high ratio of false positives to false negatives indicating a strict security service; and
- determining, based on a retrospective analysis of the disposition scores and the updated disposition scores of the plurality of computing events, an optimal threshold disposition score that produces the desired ratio of false positives to false negatives.

10. The method of claim 5, wherein the particular malware definition includes the threshold disposition score.

11. The method of claim 1, wherein the set of malware definitions includes at least one malware signature.

12. A system for evaluating security services, the system comprising:
- a reception module, stored in memory, that receives, at a backend security server from an enterprise, a plurality of suspicious computing events detected within the enterprise;
- a recording module, stored in memory, that records, within the backend security server, historical security information for each computing event that comprises:
  - a classification of the computing event as malicious or non-malicious based on a security analysis performed by the backend security server using a set of malware definitions;
  - at least one malware definition within the set of malware definitions used to classify the computing event;
  - a specific time at which the classification was determined;
- an evaluation module, stored in memory, that evaluates an ability of the backend security server to detect security threats by:
  - detecting an additional computing event within the enterprise;
  - classifying the additional computing event as malicious or non-malicious using at least one particular malware definition within the set of malware definitions;
  - determining a specific time in the past at which the backend security server became capable of classifying the additional computing event using the particular malware definition by identifying, within the historical security information, a first recorded instance of using the particular malware definition;
- a security module, stored in memory, that protects the enterprise from security threats by adjusting at least one component of the particular malware definition based on the evaluated ability of the backend security server; and
- at least one physical processor configured to execute the reception module, the recording module, the evaluation module, and the security module.

13. The system of claim 12, wherein the recording module further records, within the backend security server:
- a specific time at which each computing event was detected within the enterprise; and
- a specific time at which the backend security server received each computing event from the enterprise.

14. The system of claim 13, wherein the evaluation module evaluates the ability of the backend security server to detect security threats based on a length of time between the specific time at which at least one computing event was detected within the enterprise and the specific time at which the backend security server classified the computing event.

15. The system of claim 12, wherein the evaluation module evaluates the ability of the backend security server to detect security threats based on a retrospective analysis of the historical security information recorded in the backend security server, rather than based on virtual images of security information stored within the enterprise at various times.

16. The system of claim 12, wherein the evaluation module classifies each computing event by:
- determining a disposition score for the computing event that indicates a likelihood that the computing event is malicious; and
- comparing the disposition score of the computing event with a threshold disposition score that represents a minimum disposition score indicative of malicious computing events.

17. The system of claim 16, wherein the security module adjusts the component of the particular malware definition by determining an optimal threshold disposition score that results in an earlier time at which the backend security server became capable of classifying the additional computing event.

18. The system of claim 17, wherein the evaluation module further:
- determines, for each computing event after the disposition score for the computing event has been determined, an updated disposition score based on new security information that was not available when the disposition score was determined; and
- determines, for each computing event, an updated classification by comparing the updated disposition score of the computing event with the threshold disposition score.

19. The system of claim 18, wherein the evaluation module further evaluates the ability of the backend security server to detect security threats further by:
- determining a false positive rate produced by the threshold disposition score by calculating a percentage of computing events that have a classification of malicious and an updated classification of non-malicious; and
- determining a false negative rate produced by the threshold disposition score by calculating a percentage of computing events that have a classification of non-malicious and an updated classification of malicious.

20. A non-transitory computer-readable medium comprising one or more computer-readable instructions that, when executed by at least one processor of a backend security server, cause the backend security server to:
- receive, at the backend security server from an enterprise, a plurality of suspicious computing events detected within the enterprise;
- record, within the backend security server, historical security information for each computing event that comprises:
  - a classification of the computing event as malicious or non-malicious based on a security analysis performed by the backend security server using a set of malware definitions;
  - at least one malware definition within the set of malware definitions used to classify the computing event;
  - a specific time at which the classification was determined;
- evaluate an ability of the backend security server to detect security threats by:
  - detecting an additional computing event within the enterprise;
  - classifying the additional computing event as malicious or non-malicious using at least one particular malware definition within the set of malware definitions;
  - determining a specific time in the past at which the backend security server became capable of classifying the additional computing event using the particular malware definition by identifying, within the historical security information, a first recorded instance of using the particular malware definition; and
- protect the enterprise from security threats by adjusting at least one component of the particular malware definition based on the evaluated ability of the backend security server.

* * * * *